Patented Nov. 27, 1951

2,576,386

UNITED STATES PATENT OFFICE 2,576,386

INHIBITION OF SCALE FORMATION IN STEAM GENERATION

Paul G. Bird, Western Springs, Ill., assignor to National Aluminate Corporation, Chicago, Ill., a corporation of Delaware No Drawing. Application December 6, 1948, Serial No. 63,856

5 Claims. (Cl. 252—181)

This invention relates to the prevention of inhibiting of scale in evaporators, feed water heaters, economizers, boilers and other parts of steam generating systems. More specifically, it relates to the prevention of scale in steam generators by incorporating in the feed water going to the evaporator, boiler or the like, a water soluble organic material prepared by the treatment of a lignosulfonate under certain conditions of temperature, pressure and time, as more fully described hereinafter.

It is known that certain organic compounds, when added to the feed water going to a boiler, evaporator or other types of equipment in which the water is to be heated, and which contains scale-forming salts such as calcium and magnesium compounds, will reduce the amount of scale which forms on the heating surfaces of the equipment. Among the common organic compounds used for such purposes are various natural tannin extracts such as chestnut, cutch, quebracho, etc.

There are two predominant types of scale encountered in the operation of boilers, evaporators and other steam generators, depending on the mode of treatment of the feed water. Where the feed water is to be heated under low pressure, i. e., up to approximately 350 p. s. i. sodium carbonate is generally used as a component of the treatments and the resulting deposits or scale tend to be predominantly calcium carbonate. In some cases the feed water treatment contains substantial amounts of phosphate, in which case the resulting deposits will also contain magnesium and calcium phosphate or hydroxy apatite. Where the feed water is to be heated under higher pressures, i. e., above about 350 p. s. i., the alkali phosphates are generally used and the resulting scale or deposit tends to be primarily magnesium and calcium phosphate or hydroxy apatite.

The previously described organic materials are effective in varying degrees in preventing carbonate scale, and less effective in preventing phosphate scale at low pressures, but are substantially ineffective in preventing or inhibiting magnesium and calcium phosphate scale which occurs in steam generators operating under high pressures and temperatures. The materials of the present invention show greatly improved scale inhibiting characteristics for both carbonate and phosphate scale at low pressure, and even exhibit appreciable inhibiting effect on phosphate scale in the higher pressure regions.

One of the objects of the present invention is to provide a new and improved method of preventing or inhibiting scale in steam generators operating at pressures up to approximately 350 p. s. i. Other objects will appear hereinafter.

In accordance with the invention it has been found that certain lignin derivatives prepared by heating sodium lignosulfonate, such as that obtained from the sulfite pulp process, in the presence of an excess of caustic soda at a temperature within the range of 200 degrees C. to 225 degrees C. under superatmospheric pressure for a period of 20 to 120 minutes, are particularly effective in preventing calcium carbonate scale and calcium phosphate scale in steam generators operating under pressures up to approximately 350 p. s. i. The compositions used for the purpose of the invention may be described as partially desulfonated lignosulfonate compounds.

The preferred compositions employed for the purpose of the invention are obtained by the controlled alkaline hydrolysis of an aqueous mixture containing by weight 250 to 350 grams per liter of sodium lignosulfonate substantially free from calcium and magnesium, and caustic soda in quantity sufficient that the mixture contains from about 8 to 25 grams per liter free NaOH prior to digestion, the hydrolysis being effected by heating said mixture under superatmospheric pressures, e. g., 1000 pounds per square inch, sufficient to maintain the liquid phase, at temperatures from 200 degrees C. to 225 degrees C. for a period of 20 to 120 minutes. After the hydrolysis, the excess caustic soda remaining may be partially neutralized with sulfuric acid ($H_2SO_4$) or carbon dioxide ($CO_2$) to a pH of approximately 10.5 after which the solution may be utilized directly or dried.

In practicing the invention, the above described compositions may be added directly to a boiler without first incorporating them into the feed water, but it is usually preferable to incorporate the compositions into the boiler water by adding them to the feed water, with or without the addition of other water treating chemicals. This may be accomplished by preparing the scale preventing compositions in the form of briquettes which may also contain soda ash, phosphates or other materials to be added to the water for specific purposes.

In general, the quantity of the partially desulfonated lignosulfonate compound employed for the purpose of the invention will be of the order of 2 to 35 parts per million, by weight, in the feed water, depending upon the amount and type of the suspended solids which will be produced in the boiler by the impurities present in the feed water.

An alkali such as, for example, caustic soda, sodium carbonate or an alkaline phosphate is generally required to adjust the boiler water to the desired point of alkalinity or pH. In the practice of the present invention the liquor resulting from the alkaline hydrolysis as previously described can be used directly without neutralizing or drying, thereby taking advantage of the excess caustic when that is desirable. This also results in a saving in drying costs.

As stated above, it is often preferred to prepare the product in a dry form so that in use it may be mixed with other water treating chemicals and employed in a pulverized or briquetted form. To facilitate drying and to reduce the affinity of the product for oxygen and moisture, it is usually preferable to at least partially neutralize the final cook liquors to a pH of about 10.5 by the use of sulfuric acid, carbon dioxide or other acid.

Where the liquor is dried to a powder before use it is usually desirable, as previously indicated, to prepare the powder in the form of a briquette, either alone or in combination with other water treating chemicals such as soda ash, alkali orthophosphates, acid phosphates, alkali polyphosphates and/or tannins.

It will be understood that the term "phosphate" as used herein is employed in a generic sense to cover orthophosphates, for example, monosodium phosphate, disodium phosphate and trisodium phosphate, or any other phosphate, or compound decomposing to a phosphate, which has a tendency to form a phosphate scale.

The expression "low pressure steam generation" as used herein refers to steam generation at pressures up to about 350 pounds per square inch (p. s. i.) and the corresponding temperatures.

The invention is hereby claimed as follows:

1. In the generation of steam, the process of inhibiting scale which comprises incorporating with the water from which the steam is generated a scale inhibiting water soluble composition resulting from the alkaline hydrolysis of sodium lignosulfonate with caustic soda at temperatures within the range of 200 degrees C. to 225 degrees C. for a period of 20 to 120 minutes under superatmospheric pressures sufficient to maintain the liquid phase, the quantity of said composition being sufficient substantially to inhibit said scale formation.

2. In the generation of steam, the method which comprises generating steam from water containing a carbonate under conditions wherein scale would normally tend to form and inhibiting the scale formation by incorporating with the water from which the steam is generated a scale inhibiting water soluble composition resulting from the alkaline hydrolysis of sodium lignosulfonate with caustic soda at temperatures within the range of 200 degrees C. to 225 degrees C. for a period of 20 to 120 minutes under superatmospheric pressures sufficient to maintain the liquid phase, the quantity of said composition being sufficient substantially to inhibit said scale formation.

3. The process of inhibiting scale formation in high pressure steam generation wherein a carbonate is present and carbonate scale has a tendency to form which comprises incorporating with the boiler water a water soluble lignin product resulting from the alkaline hydrolysis of sodium lignosulfonate with caustic soda within a temperature range of 200 degrees C. to 225 degrees C. for a period of 20 to 120 minutes under superatmospheric pressures sufficient to maintain the liquid phase, the quantity of said water soluble lignin product being sufficient substantially to inhibit said scale formation.

4. In the generation of steam, the process of inhibiting scale which comprises incorporating with the water from which the steam is generated a scale inhibiting composition resulting from the alkaline hydrolysis of an aqueous mixture derived from waste sulfite liquor containing by weight 250 to 350 grams per liter of sodium lignosulfonate substantially free from calcium and magnesium ions, and 8 to 25 grams per liter of caustic soda, said aqueous mixture being hydrolyzed under superatmospheric pressures sufficient to maintain the liquid phase at temperatures within the range from 200 degrees C. to 225 degrees C. for a period of 20 to 120 minutes, the quantity of said composition being sufficient substantially to inhibit said scale formation.

5. In the generation of steam, the method which comprises generating steam from a water containing a carbonate and a phosphate under low pressure steam generation conditions wherein carbonate and phosphate scales would normally tend to form and inhibiting said scale formation by incorporating with said water about 2 to 35 parts per million by weight of a water soluble composition resulting from the alkaline hydrolysis of sodium lignosulfonate with caustic soda within a temperature range of 200 degrees C. to 225 degrees C. for a period of 20 to 120 minutes under superatmospheric pressures sufficient to maintain the liquid phase, the quantity of said composition being sufficient substantially to inhibit said scale formation.

PAUL G. BIRD.

REFERENCES CITED

The following references are of record in the file of this patent:

UNITED STATES PATENTS

| Number | Name | Date |
| --- | --- | --- |
| 2,200,784 | Wallace | May 14, 1940 |
| 2,297,670 | Schroeder et al. | Sept. 29, 1942 |
| 2,318,663 | Bird et al. | May 11, 1943 |
| 2,371,136 | Harmon | Mar. 13, 1945 |
| 2,505,457 | Bird | Apr. 25, 1950 |

FOREIGN PATENTS

| Number | Country | Date |
| --- | --- | --- |
| 619,040 | France | Dec. 23, 1926 |
| 832,224 | France | June 27, 1938 |